Figure 6:
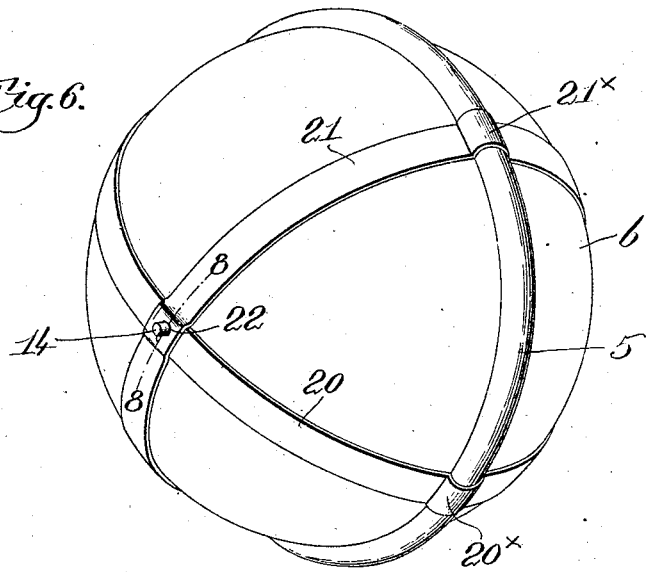

No. 855,659. PATENTED JUNE 4, 1907.
W. A. O'BRIEN.
FLOAT.
APPLICATION FILED JULY 24, 1906.
2 SHEETS—SHEET 1.
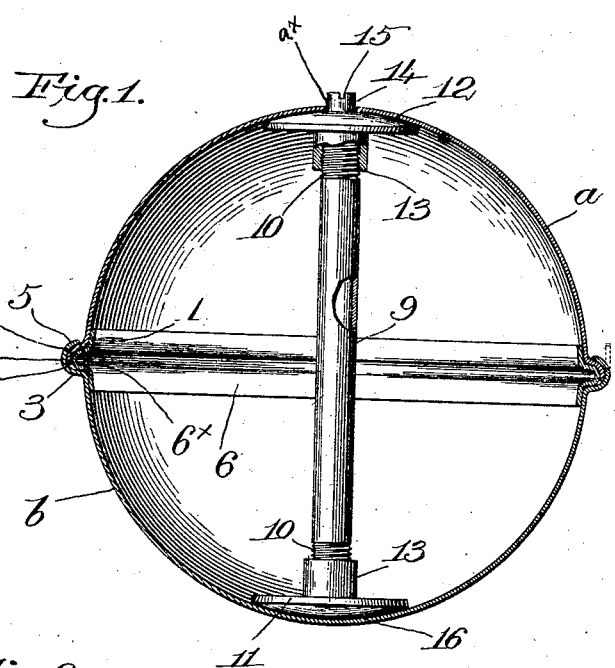
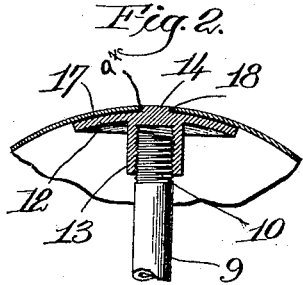
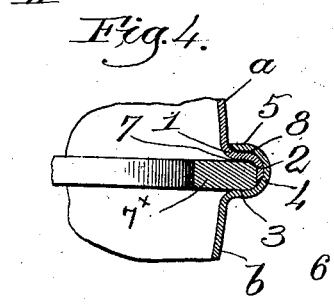
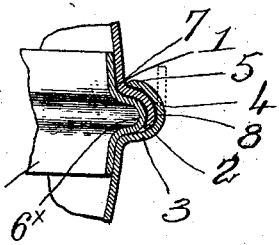
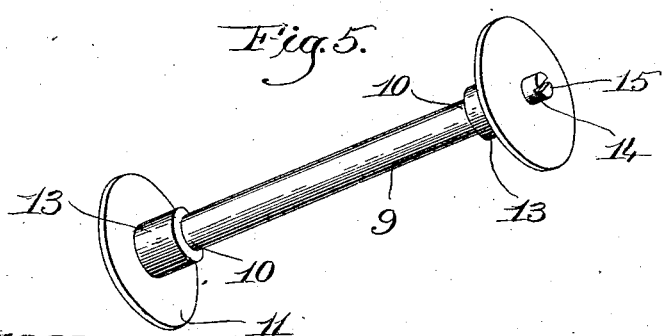
Witnesses.
Thomas J. Drummond
W. L. Friary
Inventor.
Walter A. O'Brien
By Crosby Gregory Attys.
THE NORRIS PETERS CO., WASHINGTON, D. C.

No. 855,659. PATENTED JUNE 4, 1907.
W. A. O'BRIEN.
FLOAT.
APPLICATION FILED JULY 24, 1906.

2 SHEETS—SHEET 2.

Witnesses.
Thomas J. Drummond
W. L. Friary

Inventor.
Walter A. O'Brien
by Crosby Gregory attys.

UNITED STATES PATENT OFFICE.

WALTER A. O'BRIEN, OF BOSTON, MASSACHUSETTS, ASSIGNOR OF ONE-HALF TO WILLIAM R. TEMPLETON, OF BOSTON, MASSACHUSETTS.

FLOAT.

No. 855,659.  Specification of Letters Patent.  Patented June 4, 1907.

Application filed July 24, 1906. Serial No. 327,574.

*To all whom it may concern:*

Be it known that I, WALTER A. O'BRIEN, a citizen of the United States, and a resident of Boston, county of Suffolk, State of Massachusetts, have invented an Improvement in Floats, of which the following description, in connection with the accompanying drawings, is a specification, like letters on the drawings representing like parts.

This invention relates to hollow metallic floats and has for its object the production of a novel and efficient float of such general character constructed and arranged to present great resistance to compressive or crushing strains, and at the same time combining strength with lightness. Very frequently floats of this type are made by striking up or spinning two hemispherical sections of sheet metal and uniting the same at their edges by overlapped beads sweated, soldered or otherwise secured together to form a fluid-tight joint. Such floats can withstand moderate pressures without collapsing or rupturing, but in many cases floats are required capable of withstanding a pressure of two hundred pounds and upward per square inch, and such pressures act in two ways on the floats of usual construction. That is, in one instance the overlapped edges of the sections are ruptured by more or less partial collapse of the innermost edge, allowing fluid to enter and rendering the float worthless, or in the other instance the pressure collapses the float in the direction of its axis. This axial collapse has occurred at pressures but little over two hundred pounds per square inch.

In accordance with my present invention, I construct the float of two hollow sections united at their edges to form a fluid-tight joint, and I provide novel internal means to brace the float, preferably both axially and transversely, against the crushing, collapsing or rupturing action of high external pressure. Preferably the transverse bracing is effected by means of an annular pressure-resisting member suitably secured within the float adjacent the joint formed at the edges of the hollow sections thereof, the ring-like form of said member combining great resistance to pressure with lightness. Such pressure-resisting member is introduced to operative position prior to the permanent connection of the float sections, and it prevents any separation of the overlapped portions of said sections in the completed float, under all practical working pressures. To prevent axial collapse of the float I have provided an axially-arranged compression-strut or brace, so constructed that it may be externally adjusted to exactly the right length, after which the float is finally sealed.

In practice the ends of the strut are fixedly attached to the polar portions of the sections by solder, and this is readily accomplished by facing the enlarged ends of the strut with solder and softening the same by heat applied externally after the edges of the sections have been united.

It will thus be seen that I have provided a float internally braced axially and also transversely or equatorially, as it may be termed, so that buckling, collapse, or opening of the joint between the edges of the sections is practically impossible under any working conditions. I have also provided novel means to connect the float to the arm or stem which is controlled in its movement by the rise and fall of the float.

The various novel features of my invention will be fully described in the subjoined specification and particularly pointed out in the following claims.

Figure 7:
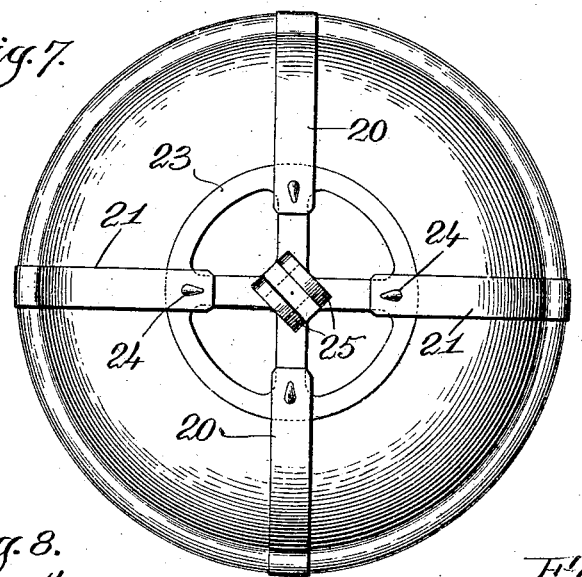
Figure 8:
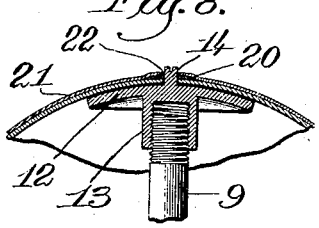
Figure 9:
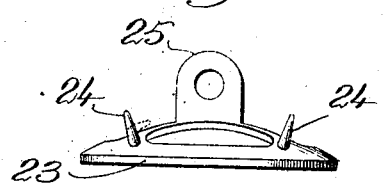

Figure 1 is a vertical diametral section of a float embodying one form of my present invention, the greater part of the compression-strut or brace being shown in elevation; Fig. 2 is an enlarged detail in section showing one mode of sealing the float after the length of the compression-strut has been adjusted; Fig. 3 is an enlarged sectional detail of the joint between the sections shown in Fig. 1 illustrating clearly one form of the transverse or equatorial pressure-resisting member embodying my present invention; Fig. 4 is a similar view of another form of pressure-resisting member; Fig. 5 is a perspective view of the compression-strut, detached; Fig. 6 is a perspective view of the float showing the means for connecting it with the operating arm or stem; Fig. 7 is a face view of the float, showing the structure at the opposite end of its polar axis from that illustrated in Fig. 6; Fig. 8 is a sectional detail on the line 8—8, Fig. 6; Fig. 9 is a side elevation of the strap or band connector shown in Fig. 7.

The two hollow, hemispherical sections *a*, *b*, of the float are first spun or struck up in usual manner of sheet metal, preferably copper of suitable thickness, and one of the sections is provided at its edge with a bead bent to present an outwardly extending flange 1, and at its periphery a lateral lip 2 Figs. 1, 2 and 4. The edge of the section $b$ is similarly shaped to present a flange 3 but somewhat wider than the flange 1 and a peripheral lip 4 is formed on the flange 3 but of considerably greater depth than the lip 2, so that when the sections are put together the lip 2 rests upon the flange 3, and the lip 4 overlaps the lip 2, to be turned down around and over it, as shown in full lines at 5, Figs. 1, 3 and 4.

The flanges project substantially at right angles to the sections and when the latter are abutted, the flanges are opposite each other and with the lip 2 form an annular recess or seat in the interior of the float. In one form of my present invention I utilize this seat to support and position a transverse or equatorial pressure resisting member or brace, and referring to Figs. 1 and 3, said member is shown as a band-like metallic ring 6, the thickness and width of the ring depending upon the diameter of the float and the pressure which it may be called upon to withstand. This member or brace 6 is shaped transversely to present upon its outer face a bead-like enlargement $6^\times$, of such external dimensions and contour as to fit snugly in the annular recess or seat, against the lip 2, throughout its extent. The portions of the ring above and below the bead are adapted to abut against the adjacent bent portions of the float sections $a$ and $b$, as clearly shown in Fig. 3. While such pressure resisting member or brace may be merely held in the seat, I prefer to positively secure it in position and to this end I attach it to the member $a$ by solder 7 interposed between the flange 1 and the adjacent face of the member 6. This attachment of the pressure-resisting member is in practice accomplished before the float sections are assembled. The bead-like enlargement $6^\times$ prevents any separation of the overlapped lips 2 and 4, due to external pressure, and the portions of the ring 6 above and below said enlargement brace the float sections at the bends made by the flanges 1 and 3.

Instead of the brace just described, I may employ a flat annular pressure-resisting member as $7^\times$, see Fig. 4, of sufficient thickness and diameter to abut against the inner lip of the two overlapped lips, and such member is preferably held in place by solder between it and the section $a$. This form of brace may be used for floats subjected to lower pressures.

I may apply the solder in wire form between the pressure resisting member and the section $b$ of the float, fusing the solder after the sections are assembled, by applying external heat adjacent the joint. The annular pressure-resisting member prevents any opening of the joint which unites the float sections, for the greater the external pressure the better will the resisting member act to hold the overlapped portions of the joint pressed together, so that rupture of the joint is a practical impossibility.

Inasmuch as the member 6 abuts directly against the inner lip 2, and also against the bends of the float sections adjacent their flanges, I prefer that form for the pressure resisting member where the pressure is very great, as the overlapped lips are pressed together, and pressed against the bead-like enlargement $6^\times$ of the ring 6, and the bends of the float sections against the ring above and below such enlargement, so that the greater the external pressure, the more tightly will the said portions be pressed one against the other and the joint be maintained intact.

I have provided an axial compression strut or brace for the float, the construction of which will be hereinafter described, and after such strut or brace is positioned, the float sections $a$ and $b$ are united permanently by solder interposed between the overlapped lips 2 and 4, as at 8, Figs. 3 and 4, the solder extending up within the part 5 of the outer lip 4, and against the adjacent portion of the section 2, making a strong and durable fluid-tight joint.

The axial strut or brace is provided because at pressures in the vicinity of two hundred pounds per square inch a float of this character can be collapsed if unsupported or braced internally along its axis, and I have so constructed the strut that it may be given a final longitudinal adjustment from the exterior of the float after the sections have been assembled and united at their edges.

In the present embodiment of my invention the compression strut or brace comprises a hollow post 9 threaded at its extremities at 10, and provided with enlarged and externally convexed end members 11, 12, preferably made as castings. Each of said end members has on its inner face a threaded boss 13 to receive one of the threaded extremities of the post 9, and by relative rotation of the latter and the said members 11, 12 the effective length of the strut may be varied.

In practice the member 11 is tightly screwed on to the post while the member 12 is left free to turn on its end of the post until the longitudinal adjustment of the strut has been effected, as will be described. Said end members are in practice tinned or otherwise prepared and their convex faces provided with a coating or layer of solder, the convexity of the faces corresponding to the curvature of the float sections $a$ and $b$. One of the sections, as $a$, has an axial or polar opening $a^\times$, Figs. 1 and 2, large enough to readily receive a cylindrical projection or stem 14 on the end member 12, and in Fig. 1 I have shown the stem as provided with a nick 15 in its end. After the transverse pressure-resisting member or ring is secured in place as has been described in one of the sections, the compression strut is placed in position with the stem 14 extending through the hole $a^\times$, the strut having previously been made a little shorter than its final length. The end member 11 is secured to the section $b$ before assembling the sections by melting the solder on the face of said end member, and applying it to the inner surface of the section $b$, the solder being indicated at 16, Fig. 1. The sections are now put together, with the stem protruding through the hole $a^\times$, and the overlapped edges of the section are soldered together to make the fluid-tight joint. Now by means of a screw-driver or other suitable tool applied to the stem 14, the end member 12 is turned, relatively to the post 9, until the convex face of said end member is brought firmly against the inner surface of the section $a$, thereby giving the final adjustment to the strut, so that it shall be of exactly the correct effective length for the float. Heat is then applied to soften the solder on the face of the end member 12, and the latter is permanently attached to the section $a$ by the solder as at 17, Fig. 2. The opening $a^\times$ can now be closed or sealed by solder, 18, around the stem 14, as best shown in Fig. 2. The float is now sealed fluid tight, and it is internally braced axially, and transversely or equatorially, and can withstand any working pressure to which it may be subjected. The stem 14 may be cut off flush with the surface of the float, as shown in Fig. 2, or as will be presently described, it may be utilized to assist in positioning straps or bands upon the exterior of the float. It will be manifest that by shortening the strut to less than its final length, when assembling the parts of the float, no obstacle is present to the accurate fitting together of the overlapping portions of the sections $a$ and $b$.

In order to provide a convenient connection between the float and the arm or lever which is controlled in its movements by rise and fall of the float, I provide a basket-like device, see Figs. 6 and 7, shown as consisting of two metallic straps or bands 20, 21, of sufficient length to pass around the float, the bands being crossed and perforated at 22, to receive the stem 14. A ring-like spider 23, made as a casting of brass or other suitable material, is provided with pins 24, herein shown as four in number, equi-distant from each other, and with ears 25, see Figs. 7 and 9. The free ends of the straps 20 and 21 are provided with holes, to be entered by pins 24 after the straps are drawn up around the float, and thereafter the pins are bent down or over, as shown in Fig. 7, and in dotted lines in Fig. 9, locking the straps in position, and connecting their free ends by means of the spider 23. The latter is located on the exterior of the float axially opposite the stem 14. After the straps or bands have thus been secured at their free ends, they are bent over the bead-like joint between the sections $a$ and $b$ of the float, such bends being shown at $20^\times$, $21^\times$, thereby tightening the straps and forming a firm, strong and yet light cage or holder permanently inclosing the float. The overlapped or crossed portions of the bands are held from displacement by stem 14, as will be manifest. The ears 25 on the spider are arranged to connect the float with the operating arm or stem in any suitable manner.

Having fully described my invention, what I claim as new and desire to secure by Letters Patent is:—

1. A float comprising two hollow sheet metal sections united at their edges and having an adjacent internal annular seat, and a circular pressure-resisting member sustained in the seat, and abutting against the sections above and below the seat.

2. A float comprising two hollow sections, each provided with an outwardly extending flange having a lateral lip, the lip of one section abutting against the flange of the other section within the lip thereof and united thereto by solder, and a pressure-resisting member held in the internal seat formed by the opposed flanges and the innermost lip and abutting against the sections adjacent the bases of the flanges.

3. A float comprising two hollow sections, each provided with an outwardly extending flange having a lateral lip, the lip of one section abutting against the flange of the other section within the lip thereof and united thereto by solder, and a pressure-resisting ring soldered to the flange of one of the sections before they are united.

4. A float comprising two hollow sections, each provided with an outwardly extending flange having a lateral lip, the lip of one section abutting against the flange of the other section within the lip thereof, the latter lip being of greater depth and bent over the inner lip and united thereto by an intervening layer of solder, and a pressure-resisting ring having an external enlargement to enter and soldered in the seat formed by the opposed flanges and the innermost lip.

5. A float composed of two hollow sheet metal sections, one of which is provided with an outwardly extended flange at its edge, and a lip on the flange, a pressure-resisting ring soldered to the flange within the lip, and an outwardly extended flange on the edge of the other section, provided with a lip overlapping the lip of the first named section and soldered thereto.

6. A float comprising two hollow hemispherical sections united fluid tight at their edges, a longitudinally-adjustable compression-strut interposed between the poles of the sections, and means to effect adjustment of the strut from the exterior of the float after the sections thereof have been united.

7. A float comprising two hollow sections each provided with a lipped flange, the lips being overlapped and united by solder, one section having an axial opening, a longitudinally-adjustable compression-strut having enlarged, convexed ends to abut against the inner surfaces of the float sections at their poles, and a stem on one of the enlarged ends, to project through the axial opening and permit adjustment of the strut after the sections are soldered together, and means to seal the opening when the strut is adjusted.

8. A float comprising two hollow hemispherical sections adapted to be united fluid-tight at their edges, a longitudinally-adjustable, axially arranged compression-strut having enlarged ends placed against the sections and united thereto by an intervening layer of solder, and means to effect such adjustment from the exterior of the float after the edges of the sections are united.

9. A float comprising two hollow sections adapted to be soldered together at their edges, an axially arranged and longitudinally-adjustable compression-strut having enlarged ends faced with a layer of solder, to abut against the inner surfaces of the sections and united thereto by externally applied heat, and means to effect longitudinal adjustment of the strut after the edges of the sections are soldered together.

10. A float comprising two hollow sections united by solder at their edges, a longitudinally-extensible compression-strut axially arranged within the sections and united thereto at its ends and means to adjust the effective length of the strut from the exterior of the float.

11. A float comprising two hollow sections united at their edges, an internal axial brace secured at its ends to the inner surfaces of the sections and having a stem projecting through one of them, straps or bands passing about the float and interlocking with the said stem, and means to connect the free ends of the bands.

12. A float comprising two hollow sections united at their edges, an internal axially arranged compression strut or brace having at one end a stem extended through the adjacent section, crossed straps or bands perforated to interlock with said stem at their crossing, and a spider on the exterior of the other section opposite the adjacent end of the brace, to which the ends of the straps or bands are attached.

13. A float comprising two hollow sections united at their edges, an internal axially arranged compression strut or brace having at one end a stem extended through the adjacent section, crossed straps or bands perforated to interlock with said stem at their crossing, a spider on the other section opposite the corresponding end of the brace, means to connect the ends of the straps or bands with the spider, and means on the latter to attach the float to an operating arm.

In testimony whereof, I have signed my name to this specification, in the presence of two subscribing witnesses.

WALTER A. O'BRIEN.

Witnesses:
MARGARET A. DUNN,
EMILY C. HODGES.